United States Patent [19]

Leach

[11] 4,204,593
[45] May 27, 1980

[54] ARTICLE ACCUMULATION CONVEYOR

[76] Inventor: John M. Leach, Box 341, Port Jefferson, N.Y. 11777

[21] Appl. No.: 893,671

[22] Filed: Apr. 5, 1978

[51] Int. Cl.² .............................................. B65G 13/06
[52] U.S. Cl. ..................................... 198/781; 198/789
[58] Field of Search ............... 198/781, 789, 790, 791, 198/783, 857, 859, 460

[56] References Cited

U.S. PATENT DOCUMENTS

| 3,232,415 | 2/1966 | Gotham | 198/781 |
| 4,121,709 | 10/1978 | Gebhardt | 198/781 |

Primary Examiner—Robert B. Reeves
Assistant Examiner—Douglas D. Watts

[57] ABSTRACT

The present invention relates to an article accumulation conveyor in which the drive for moving the articles is automatically discontinued for a selected section of the conveyor when an article is stopped on another certain section of the conveyor and is started again automatically when the article moves, and the power for activating the stopping and starting instrumentalities is furnished in its entirety by the conveyor drive so that all need for extraneous power sources or force exerted by a moving article is entirely eliminated.

8 Claims, 6 Drawing Figures

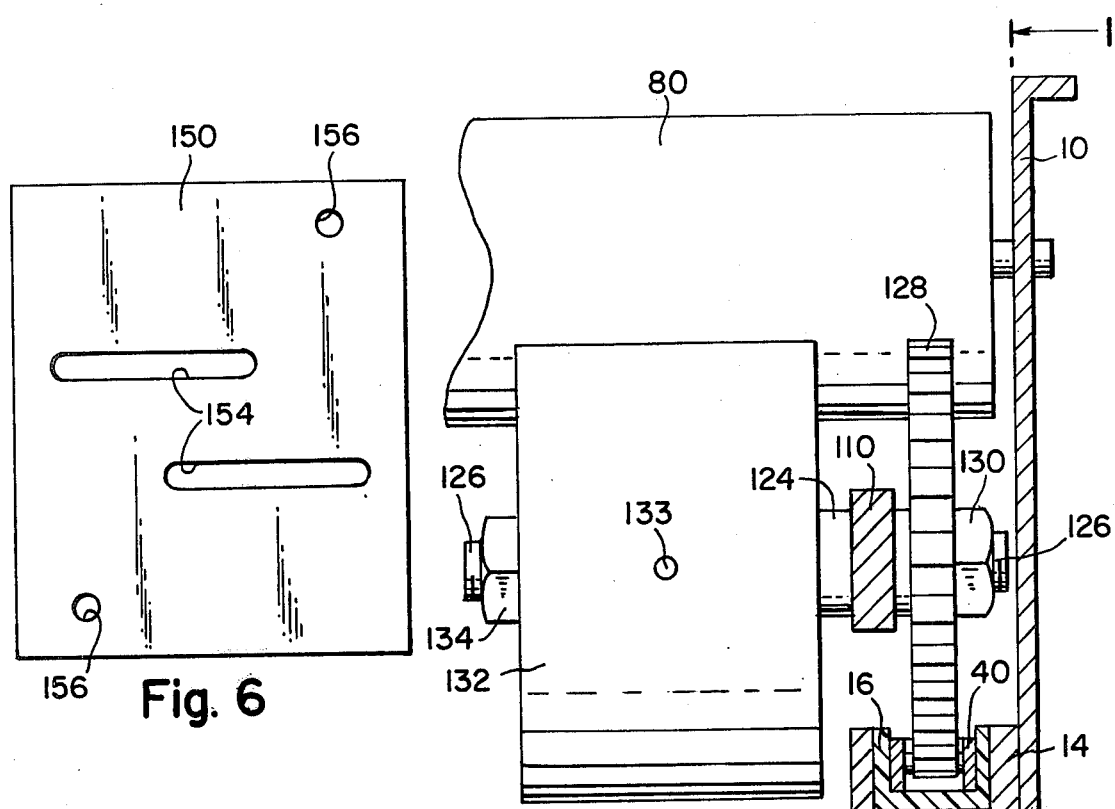
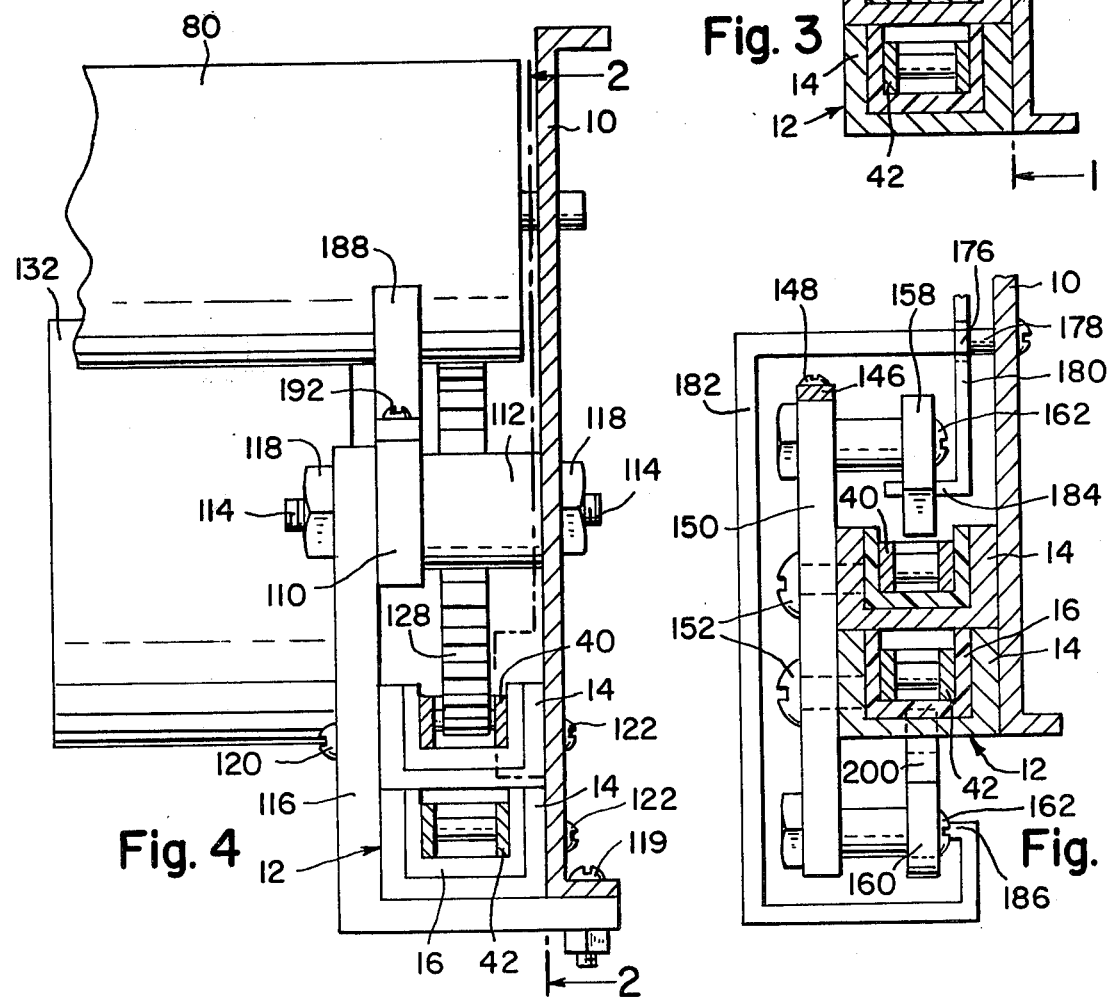

ARTICLE ACCUMULATION CONVEYOR

BACKGROUND OF THE INVENTION

In the accumulation conveyor field it has long been desired to have a unit which can handle large, heavy articles and small, light articles on the same unit.

In prior accumulation conveyors where the force required to discontinue the conveyor drive when an article was stopped on the unit and to start the drive when the stopped article again moved has been provided by a sensor operated either by the weight or the movement of an article or both.

This meant that small, light articles could not operate a clutch or the like of sufficiently heavy duty for the conveyance of heavy articles so that light and heavy articles could not be mixed unless some extraneous power source such as air or electricity was resorted to which required complicated mechanism and was expensive and required space and much maintenance. An example of such a unit is disclosed by U.S. Pat. No. 3,225,893.

Efforts have been made to produce accumulation conveyors in which the power required to operate the clutches to discontinue and then continue the movement of the articles is provided by the conveyor drive which moves the articles conveyed, but such equipment to date has been so complicated as to be prohibitively expensive, undependable or require extensive adjustment or maintenance or all of these undesirable factors.

Examples of such units are disclosed by U.S. Pat. Nos. 3,219,172; 3,285,391; 3,156,345; 3,116,823; 3,164,246; 3,206,008; 3,136,406; and 3,232,415.

SUMMARY OF THE INVENTION

It is an object of the present invention to provide an article accumulation conveyor in which light and/or small and heavy and/or large articles can be intermixed at wil on the conveyor without any untoward results and conveyed with full dexterity and freedom from trouble.

It is a further object of the present invention to provide an article accumulation conveyor in which the power required to discontinue and continue drive from the main conveyance is taken from the main conveyance itself.

It is another object of the present invention to provide a power take-off from the main conveyance itself which is simple, dependable and inexpensive and adds very few additional parts to the basic conveyor itself.

Other objects and advantages of the present invention will be apparent to those skilled in the art upon recourse to the following specifications, claims and drawings.

The present invention is an improvement upon the inventions disclosed in this applicant's prior U.S. Pat. Nos. 3,400,806; 3,451,527; and 3,589,496.

BRIEF DESCRIPTION OF THE DRAWINGS

FIG. 3 is a sectional view taken substantially on the plane indicated by line 3—3 of FIG. 2 and looking in the direction of the arrows.

FIG. 4 is a sectional view taken substantially on the plane indicated by line 4—4 of FIG. 2 and looking in the direction of the arrows.

FIG. 5 is a sectional view taken substantially on the plane indicated by line 5—5 of FIG. 2 and looking in the direction of the arrows.

FIG. 6 is a side view of a disassembled element of the invention.

DESCRIPTION OF THE PREFERRED EMBODIMENTS OF THE INVENTION

Figure 1:
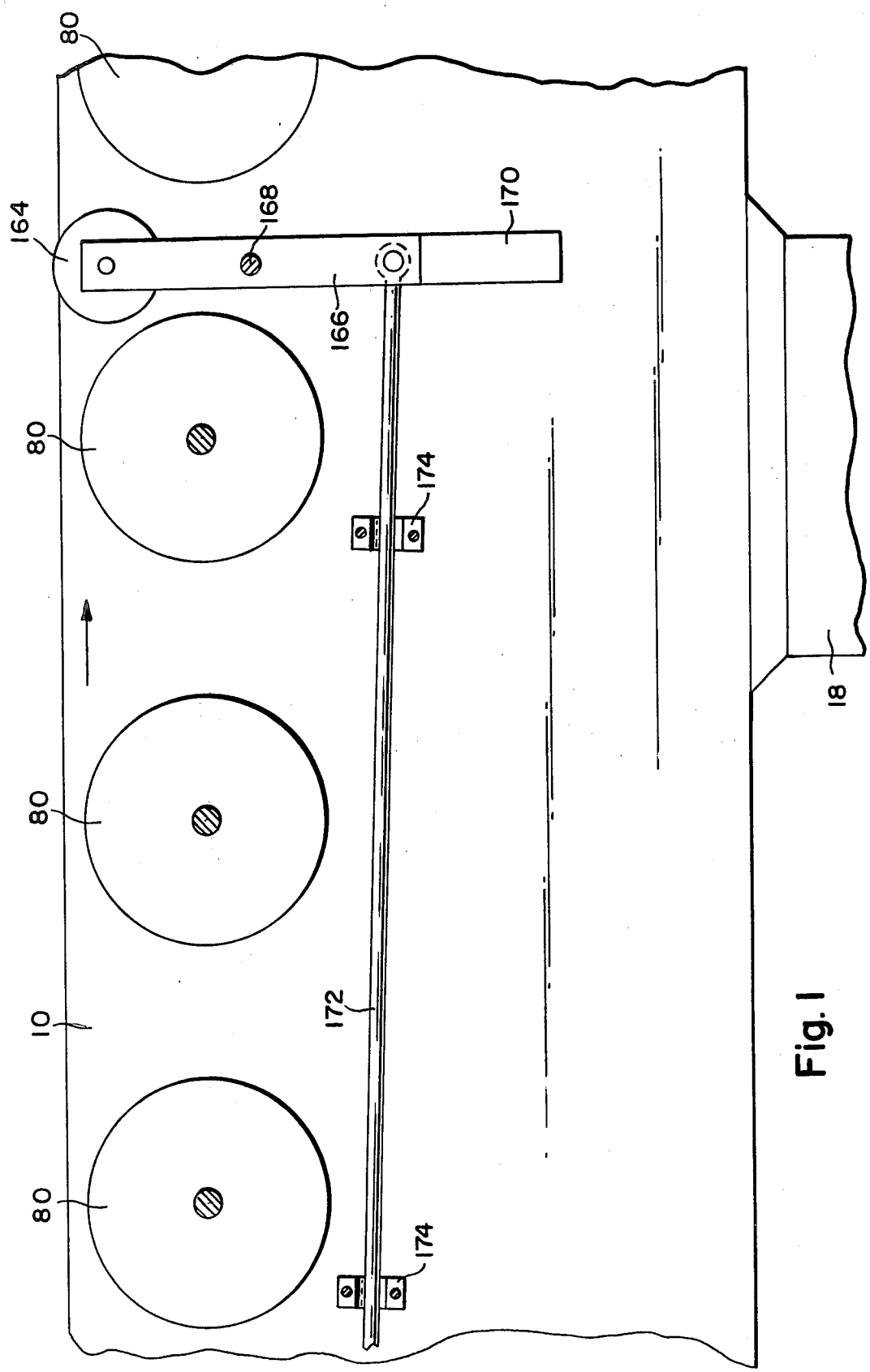
FIG. 1 is a sectional view taken substantially on the plane indicated by line 1—1 of FIG. 3 and looking in the direction of the arrows, with some parts removed.

The frame of the accumulation conveyor of the present invention is essentially the same as that shown in Applicant's prior U.S. Pat. No. 3,589,496 and consists of two side rails 10 supported by legs 18 and provided with article supporting and moving elements in the form of rollers 80 suitably mounted for free rotation.

At a distance below the rollers 80 a powered driving element is positioned and which can be a band, belt, cable chain or any equivalent element, but in this application a roller chain 38 is preferred. The chain 38 is carried by a series of guides 12 each of which comprise a guide 14 provided with a low friction liner 16 preferably formed of a plastic such as a silicone within which the chain freely slides. Such a guide 12 is provided for the top or forward run 40 as well as the return run 42 of the chain 38. The chain 38 is suitably driven by any conventional motor-gear reducer drive preferably at an end and provided with a screw take-up at the other end.

This is standard equipment and forms no novel part, per se, of the present invention.

A movable arm 110 having a boss 112 suitably attached thereto is mounted for free rotation on a shaft 114 which is shouldered and threaded at each end and passes through a suitable opening in a rail 10 at one end and through a bracket 116 at the other end and is held in place by nuts 118 which tighten on the shoulder before the arm 110 is clamped between them. The bracket 116 is bolted at 119 to the rail 10, which construction forms a strong and firm mounting for the movable arm 110. The bracket 116 is also steadied by a screw 120 attached to chain guide 14. The chain guides 14 are attached to the rail 10 at appropriate intervals by screws 122.

The arm 110 carries a second suitably attached boss 124 which is drilled and suitably sleeved to receive a shaft 126 which has a sprocket 128 fixed to it at the right end as seen in FIG. 3 as by a nut 130 and drive roller 132 suitably affixed to the left end as by through pin 133 and a nut 134. The sprocket 128 is thus held in position to mesh with the top run 40 of the chain 38 and to move up and down in an arc about the center of shaft 114. In its upper position the drive roller 132 makes driving contact with the two article carrying and moving roller elements 80 just above it and in its lower position it just breaks contact with rollers 80 and does not drive them. The sprocket 128 moves with the drive roller 132 and is permitted to do so by its loose meshing connection with the chain run 40.

This up and down movement of the sprocket-roller assembly 128, 132 (circular shaped movement transmission member) is brought about by the following arrangement: The arm 110 is notched out at 136 (FIG. 2) and a bracket 138 is suitably attached to the reduced size end 140 and carries two rollers 142, 144 suitably pivoted to the bracket leaving a slight space between them.

Figure 2:
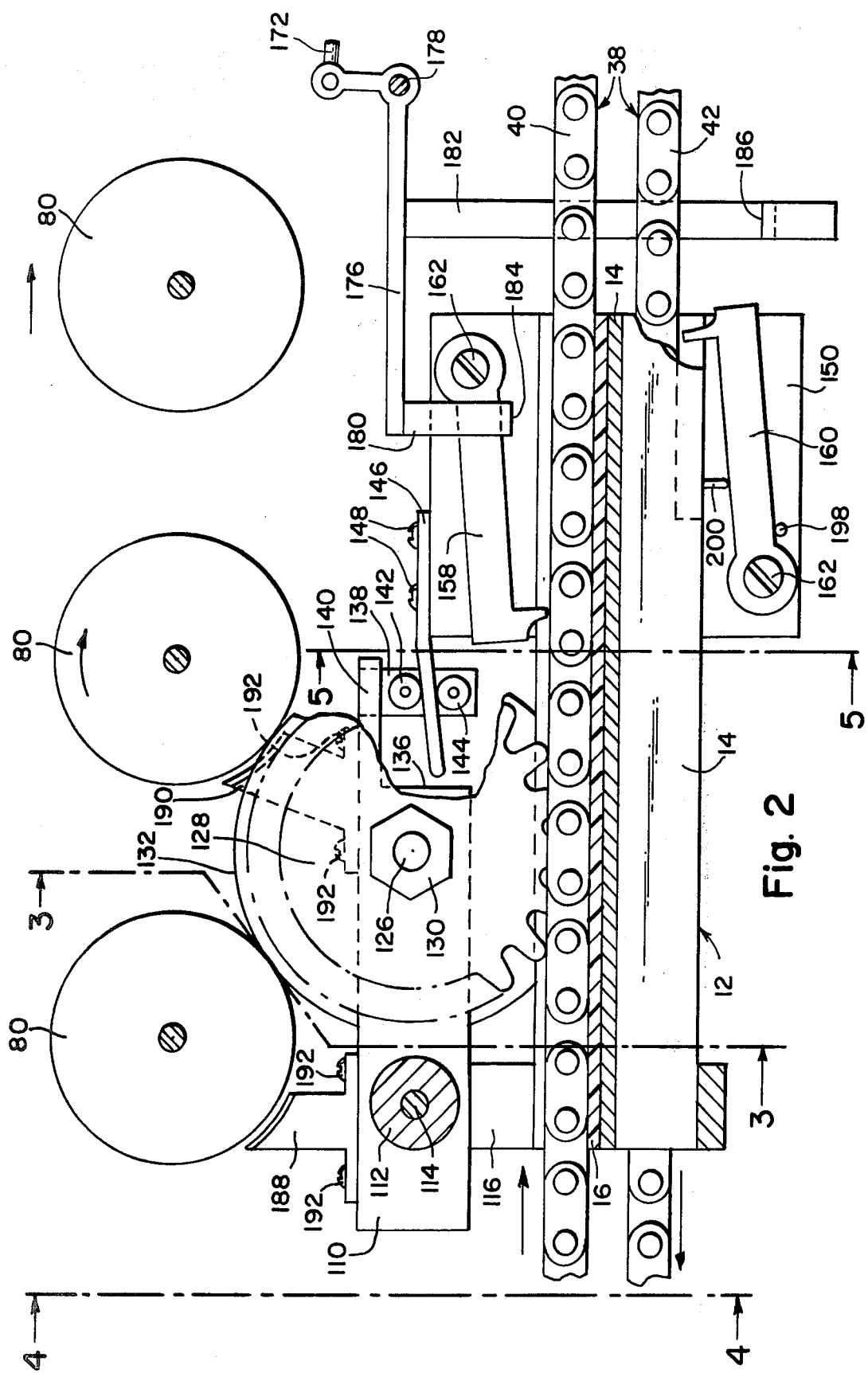
FIG. 2 is a sectional view taken substantially on the plane indicated by line 2—2 of FIG. 4 and looking in the direction of the arrows.

A blade 146 having the left end slanted downwardly as shown in FIG. 2 is attached as by the screws 148 to a plate 150 shown in stripped form in FIG. 6.

The plate 150 is attached for horizontal sliding movement to the chain guides 14 by shouldered screws 152 which extend through slots 154 in the plate 150 and tighten solid just before they clamp the plate 150. This allows the plate limited two-way horizontal movement while being held steady otherwise.

The plate 150 is provided with two threaded screw holes 156. Two motion-transmission dogs (members) 158, 160 are fastened for rotational movement to the plate 150, each by a shoulder screw 162 which fits into one of the threaded holes 156, as shown in FIG. 2. Each of the members is preferably shaped at its free end so that it can move in front of a roller on the chain 40 when allowed to do so and the end shapes shown in FIG. 2 accomplish this purpose but are not to be considered limitative because many other arbitrary shapes will also function satisfactorily for this purpose, depending on the chain pitch and speed and other frictional characteristics of the particular powered drive band used.

Referring to FIG. 1, a control means for the dogs 58 and 60 comprises a sensing roller 164 pivotally carried by an arm itself 166 pivoted at 168 to a rail 10 is positioned to be contacted and moved to the right by each article that passes over it and is held in moved position to the right when an article stops for any reason while in contact with it. This lever is held in balanced position vertically when not contacted by an article by a weight 170 carried at its lower end. A connecting rod 172, loosely suspended from a rail 10 by brackets 174 at any desired intervals suitably attached to rail 10, is connected to a belcrank 176 pivoted at 178 to a rail 10 and serves to rotate belcrank 176 counterclockwise when an article moves roller 164.

The sensor mechanism from roller 164 to belcrank 176 is conventional and, per se, forms no party of the present invention but is a necessary component of the new, useful and unobvious combination. Equivalent linkage in mechanical form, air, hydraulic or electrical linkage can be used with equal facility.

The belcrank lever has two depending arms 180 and 182, each provided with a horizontally extending foot 184, 186 and each extending under the path of movement of its respective motion-transmission dog (member) 158, 160.

It is to be understood that the article supporting and moving roller drive disclosed herein will be placed repeatedly at intervals along the total length of the article accumulation conveyor. The number used depending on the total length of the conveyor and the sizes of the articles to be conveyed. In general the longer the conveyor and the smaller the articles to be conveyed the closer the drive units must be placed.

In general the units will be placed in a group of 2, 3 or 4, or even more, all in each group controlled by one sensor roller and as many such groups as the total length of the conveyor requires.

It is to be noted that a sensor roller usually does not control the group immediately behind it but the second group behind it for usual accumulation operation. The rollers directly under the stopped article are usually either controlled by a sensor one group ahead of it or allowed to rotate so as to move the stopped article ahead when the stoppage is removed.

Operation

1. When no contact operation between the article being conveyed is required, roller stops 188 and 190 will be carried by the arm 110 as by being attached by screws 192.

All of the drive components shown in FIGS. 1 to 5 are in drive position which means that all articles are being moved along the conveyor at this time. Each sensor roller 164 will be momentarily moved ahead and downwardly as an article passes over it but as long as no article is stopped for any reason they will all continue to move. But if any one article is stopped for any reason the article immediately behind it will be stopped and this will continue all the way along the conveyor behind the stopped article until the first (or any) stopped article starts to move again or is removed from the conveyor and then the ones behind the area of the formerly stopped article will seriatum move ahead until one or more is again stopped.

This is accomplished by the present invention as follows: When an article stops on a sensor roller 164 the movement of arm 166 has moved connecting rod 172 to the left as viewed in FIGS. 1 and 2 which moved the belcrank lever 176 counterclockwise and lowered the foot 184 of arm 180 downwardly which lowered the motion-transmission dog 158 until its free end encountered a chain roller or a series of rollers as it is not necessary that just one roller be contacted as just a brushing contact with the passing rollers will move the dog 158 to the right and the plate 150 with it as well as the blade 146. Movement of the blade 146 to the right lowers the rollers 142-144 and the right end of the arm 110 and the sprocket-roller assembly 128-132 so that the roller 132 breaks contact with the rollers 80 and the roller stops 188 and 190 contact the two rollers 80 and brake them from further rotation so that any article carried by these rollers and any other rollers in the group controlled by sensor roller 164 will stop and not coast together. This separation of articles is called "singulation" because the article spacing will be maintained even after the articles start to move again.

As the dog 158 moves to the right with plate 150 it will contact the shoe 184 (cam) and be raised out of contact with the chain 40 so that the plate 150 will stop. At this point the dog 160 will be over shoe 186 of arm 182 but can not lower because of the pin 198 carried by the plate 150.

When the article on roller 164 moves ahead or is manually removed the sensor roller arm support 166 will move to vertical position under the action of weight 170 which will cause the belcrank 176 to rotate clockwise and raise the shoe 186 upon which dog 160 is then resting and raise the dog into contact with the return run 42 of the chain 38 which will move the plate 150 to the left until the dog 160 is deflected away from chain run 42 by the pin cam 200 carried by the guide 14 which will cause the plate 150 to stop. The movement of plate 150 to the left caused the blade 146 to raise the rollers 142, 144 which raised the sprocket-roller assembly 128-132 to release the roller stops 188, 190 from the rollers 80 and the roller 132 to again contact the rollers 80 and start them rotating to again move the article along the conveyor.

The chain guides 14 need not be continuous but may be only long enough to support the two chain runs 40 and 42 under the drive assemblies as shown in FIG. 2.

2. When a solid line of lightly contacting articles is desired, the roller stops 188 and 190 are omitted which permits the articles to coast lightly together before stopping but because the rollers 80 are not being driven there is very little pressure between them.

Otherwise the operation is exactly as described in operation no. 1.

The linkage shown in U.S. Pat. No. 3,537,568 may be substituted for rod 172 if such is desired.

The above description of the present invention is to be considered solely descriptive and not limitative because many changes and modifications can be made in the preferred embodiment without exceeding the basic inventive concept.

The invention having been described, what is claimed is:

1. A conveyor for articles comprising a frame, rotatable article supporting and moving elements mounted on said frame, a powered driving element carried by said frame and continuously movable in a given path always free of contact both with said rotatable article supporting and moving elements and the articles being conveyed and having a forward or top run and a return run, a circular shaped movement transmission member, means for mounting said member for rotation thereof by direct contact thereof with said powered driving element and also providing for bodily movement of said particular member so as to contact and transmit rotary movement to at least one of said article supporting and moving elements without breaking contact with said powered driving element, suport means mounted for movement in two directions parallel to the path of movement of said powered driving element and connected with said transmission member to bodily move said transmission member into and out of contact with said at least one of said rotatable article supporting and moving elements, an element mounted on said support means so that a part of it can be projected into contact with one run of said powered driving element to move said support means in a direction to bodily move said transmission member in one direction, a second element mounted on said support means so that a part of it can be projected into contact with the other run of said powered driving element to move said support means in a direction to bodily move said transmission member in the opposite direction, and control means operated by movement of the conveyed articles and connected to each of said last named elements so as to project one of them into contact with one run of said powered driving element when an article is in one position on said rotatable article supporting and moving elements and project the other of said two last named elements into contact with said powered driving element when said article is in another position on said rotatable article supporting and moving elements.

2. A conveyor for articles as specified in claim 1 further characterized by said control means including a sensor having an element so positioned as to be actuated by any article which is in a selected area on said rotatable article supporting and moving elements to cause said circular member bodily movement means to move said circular member out of driving contact with said at least one rotatable article supporting and moving element and to move said circular member back into driving contact when the said article departs said selected area.

3. An article conveyor as specified in claim 2 in which said powered driving element is a chain and said circular shaped movement transmission member includes a sprocket which meshes with said chain.

4. An article conveyor as specified in claim 3 in which said first projected element is means for bodily moving said circular shaped movement transmission members includes an elongated dog and a movable mounting to which said dog is pivoted at one end so as to be positioned adjacent to the forward run of said chain, a suspension bracket included in said article sensor control means which supports the free end of said dog adjacent to said chain but out of contact therewith when an article is not stopped on the sensor control element contacted by said conveyed articles but moves so as to release the free end of said dog when an article stops on said sensor control element which enables the dog free end to contact said chain and be thereby moved along with its support, a connection between said movable support and said bodily movable circular member which bodily moves said circular member out of driving contact with said rotatable article supporting and moving elements to discontinue the driving of them.

5. An article conveyor as specified in claim 4 in which said movable mounting for said dog also is a mounting for a second dog also pivoted thereto to one end but opposite from the end of the first dog with the free end of the second dog adjacent to the return run of said chain which runs in an opposite direction from said forward run, a second bracket included in said article sensor control means which supports the free end of said second dog adjacent to said chain but out of contact therewith when an article is stopped on said sensor control element contacted by said conveyed articles but moves when no article is stopped on said sensor control element so as to propel said second dog free end into contact with said chain and be thereby moved with its support and first dog in an opposite direction from the said first support movement which through said connection moves said bodily movable circular member into driving contact with said rotatable article supporting and movable elements.

6. An article conveyor as specified in claim 3 in which said circular shaped movement transmission member also includes a roller which at selected times contacts at least one of said article supporting and moving elements.

7. A conveyor as specified in claim 4 in which a cam is positioned so as to move said dog out of contact with said chain when driving of said article supporting and moving members has been discontinued as therein described.

8. A conveyor as specified in claim 5 in which a second cam is positioned so as to move said second dog out of contact with said chain when driving of said article supporting and moving members has been again continued as therein described.

* * * * *